(12) United States Patent
Brustle et al.

(10) Patent No.: US 11,186,169 B2
(45) Date of Patent: Nov. 30, 2021

(54) MOTOR VEHICLE WITH ALL-WHEEL DRIVE

(71) Applicant: Neander Motors AG, Kiel (DE)

(72) Inventors: Claus Brustle, Nordheim (DE); Lutz W. Lester, Emkendorf (DE)

(73) Assignee: Neander Motors AG, Kiel (DE)

( * ) Notice: Subject to any disclaimer, the term of this patent is extended or adjusted under 35 U.S.C. 154(b) by 353 days.

(21) Appl. No.: 16/364,489

(22) Filed: Mar. 26, 2019

(65) Prior Publication Data

US 2019/0291576 A1    Sep. 26, 2019

(30) Foreign Application Priority Data

Mar. 26, 2018  (DE) ..................... 10 2018 002 464.5

(51) Int. Cl.

| B60K 17/34 | (2006.01) |
|---|---|
| B60K 5/02 | (2006.01) |
| B60K 17/08 | (2006.01) |
| B60K 25/02 | (2006.01) |
| F02B 75/06 | (2006.01) |

(Continued)

(52) U.S. Cl.
CPC ............... *B60K 17/34* (2013.01); *B60K 5/02* (2013.01); *B60K 17/08* (2013.01); *B60K 17/28* (2013.01); *B60K 17/344* (2013.01); *B60K 25/02* (2013.01); *F02B 75/065* (2013.01); *F16F 15/30* (2013.01); *F16H 9/14* (2013.01); *F16H 37/0813* (2013.01);

(Continued)

(58) Field of Classification Search
CPC .......... B60K 17/34; B60K 5/02; B60K 17/08; B60K 17/28; B60K 17/344; B60K 25/02; B60K 2025/022; F02B 75/065; F16F 15/30

See application file for complete search history.

(56) References Cited

U.S. PATENT DOCUMENTS 2,915,133 A * 12/1959 Kraus ..................... B60K 5/02
                                                          180/244
3,017,783 A *  1/1962 Van ......................... G05D 13/10
                                                          474/14

(Continued)

FOREIGN PATENT DOCUMENTS

| DE | 19946336 | 4/2000 |
|---|---|---|
| DE | 102004016708 | 10/2005 |

(Continued)

*Primary Examiner* — Minnah L Seoh
*Assistant Examiner* — Michael R Stabley
(74) *Attorney, Agent, or Firm* — Diederiks & Whitelaw, PLC

(57) ABSTRACT

A motor vehicle includes a motor and a transmission including a drive shaft driven by the motor and connecting the motor to the transmission, a first output shaft extending along the vehicle longitudinal axis in the one direction, which first output shaft is connected to a wheel axle by a first differential, and a second output shaft extending along the vehicle longitudinal axis in the opposite direction, which second output shaft is connected to a second wheel axle by a second differential, characterized in that the drive shaft is disposed in the longitudinal axis of the motor vehicle and the first and the second output shaft are disposed on opposing sides relative to the longitudinal axis of the motor vehicle with identical spacing with respect to the longitudinal axis of the motor vehicle.

27 Claims, 3 Drawing Sheets

(51) Int. Cl.
  *F16F 15/30* (2006.01)
  *F16H 9/14* (2006.01)
  *F16H 37/08* (2006.01)
  *B60K 17/28* (2006.01)
  *B60K 17/344* (2006.01)
(52) U.S. Cl.
  CPC ..... *B60K 2025/022* (2013.01); *B60Y 2400/72* (2013.01)

(56) References Cited

U.S. PATENT DOCUMENTS

| | | | | |
|---|---|---|---|---|
| 3,017,785 A | * | 1/1962 | Van | F16H 61/66263 477/40 |
| 3,331,464 A | | 7/1967 | Van Doorne | |
| 3,613,816 A | * | 10/1971 | Gutbrod | B62D 49/0635 180/53.1 |
| 5,527,225 A | * | 6/1996 | Dick | B60K 17/342 180/251 |
| 5,704,866 A | * | 1/1998 | Pritchard | F16H 3/089 180/248 |
| 6,030,312 A | * | 2/2000 | Nesbitt | B60K 17/346 180/248 |
| 6,086,492 A | * | 7/2000 | Nakano | F16H 55/563 474/14 |
| 6,182,784 B1 | * | 2/2001 | Pestotnik | B60K 5/06 180/337 |
| 6,270,436 B1 | * | 8/2001 | Reik | F16H 9/14 474/15 |
| 6,702,709 B2 | * | 3/2004 | Bowen | B60L 7/14 475/277 |
| 6,904,994 B2 | * | 6/2005 | Coutant | B60K 11/02 180/291 |
| 7,377,351 B2 | * | 5/2008 | Smith | B60K 17/354 180/233 |
| 8,512,181 B2 | * | 8/2013 | Mitsubori | B60K 17/06 474/8 |
| 10,563,726 B2 | * | 2/2020 | Bruestle | F02B 75/225 |
| 2007/0144283 A1 | * | 6/2007 | Hasegawa | B60K 17/04 74/325 |
| 2013/0138309 A1 | * | 5/2013 | Kabe | F16H 59/18 701/58 |
| 2018/0112738 A1 | | 4/2018 | Bruestle et al. | |

FOREIGN PATENT DOCUMENTS

| | | |
|---|---|---|
| DE | 102011015720 | 10/2012 |
| DE | 102011104496 | 12/2012 |
| DE | 102016013288 | 5/2018 |
| EP | 0901422 | 3/1999 |
| JP | S6460427 | 3/1989 |

* cited by examiner

MOTOR VEHICLE WITH ALL-WHEEL DRIVE

CROSS-REFERENCE TO RELATED APPLICATION

This application claims priority from German Patent Application No. 10 2018 002 464.5 filed on 26 Mar. 2018.

BACKGROUND OF THE INVENTION

The invention relates to a motor vehicle including a motor and a transmission including a drive shaft driven by the motor, which drive shaft connects the motor to the transmission, a first output shaft extending along the vehicle longitudinal axis in the one direction, which first output shaft is connected to a wheel axle by a first differential, and a second output shaft extending along the vehicle longitudinal axis in the opposite direction, which second output shaft is connected to a second wheel axle by a second differential.

Such a motor vehicle is already known from DE 10 2017 007 552 A1.

Furthermore, a vehicle having high off-road capability is known from U.S. Pat. No. 3,331,464 A for which an internal combustion engine disposed between a front axle and a rear axle serves as a drive system. The internal combustion engine including a centrifugal clutch acts on a first bevel-disk pair of a CVT transmission (CVT: Continuously Variable Transmission) with a drive shaft extending perpendicular to the vehicle longitudinal direction and an angle drive. Its second bevel-disk pair is connected to a transmission that is connected on one side with the rear axle and on the other side with the front axle in operative connection such that the motor vehicle is driven in a four-wheel manner via front wheels of the front axle and rear wheels of the rear axle.

JP S6 460 427 A discloses a tractor having four-wheel output for agricultural purposes. This tractor includes an internal combustion engine that works together with a CVT transmission including a spaced bevel-disk pair. An endless drive element is provided between the bevel-disk pairs. A first bevel-disk pair works together with wheels of a rear axle with engaging of a spur gearing and an angle drive. Furthermore, the CVT transmission transmits drive forces using a second bevel-disk pair to a transmission that drives wheels of the front axle by intermediation of a Cardan shaft and a differential.

However, a disadvantage of the known motor vehicles having all-wheel drive is the lack of smooth running and the partially improvable stability of the motor vehicle overall, i.e., ultimately the low driving comfort, which is specifically due on the one hand to the difficult ground conditions for which vehicles with all-wheel drive are used, but on the other hand due to the construction of such vehicles.

The object of the invention is therefore to provide a motor vehicle with all-wheel drive having improved smooth running, greater stability, and high driving comfort.

SUMMARY OF THE INVENTION

According to the invention a motor vehicle is thus proposed including a motor and a transmission including a drive shaft driven by the motor and connecting the motor to the transmission, a first output shaft extending along the vehicle longitudinal axis in the one direction, which first output shaft is connected to a first wheel axle by a first differential, and a second output shaft extending along the vehicle longitudinal axis in the opposite direction, which second output shaft is connected to a second wheel axle by a second differential, wherein the drive shaft is disposed in the longitudinal axis of the motor vehicle, and the first and second output shafts are disposed spaced along opposite sides with respect to the longitudinal axis of the motor vehicle with identical spacing to the longitudinal axis of the motor vehicle.

The motor of the motor vehicle is preferably an internal combustion engine, in particular a diesel engine.

Preferably it is not only provided that the first and second output shafts are disposed on opposite sides with respect to the longitudinal axis of the motor vehicle with identical spacing from the longitudinal axis of the motor vehicle, but also that the engine, in particular the diesel engine, is disposed such that the first and the second drive shaft are preferably also disposed on opposite sides of the longitudinal axis of the engine with identical spacing from the longitudinal axis of the engine.

Particularly preferably the internal combustion engine, in particular the diesel engine, includes two crankshafts driven synchronously in opposite directions, which crankshafts are each connected to at least one common piston by a connecting rod, wherein the crankshafts are highly preferably disposed symmetrically with respect to the longitudinal axis of the motor vehicle.

According to a further preferred design the one crankshaft is connected to the drive shaft of the transmission by an intermediate transmission, wherein the intermediate transmission is configured specifically as a spur gearing. The spur gearing is preferably formed from a first gear connected to the first crankshaft and a second gear connected to the drive shaft of the transmission, wherein the first gear further preferably has a smaller diameter than the second gear.

The crankshafts are preferably oriented horizontally, wherein further preferably flywheels are disposed on the end of the crankshafts opposite the intermediate transmission. Thus, according to a further advantageous embodiment, it is provided that at least one PTO shaft that is connected to one of the crankshafts such that they rotate together, wherein the PTO shaft is disposed adjacent to the flywheel of the crankshaft.

The first output shaft and the second output shaft are specifically oriented with respect to each other such that they are disposed in one plane. Preferably the crankshafts are also disposed in the plane of the output shafts.

The transmission of the vehicle is preferably a stepless transmission, specifically a CVT transmission including a bevel-disk pair driven by the drive shaft. An endless drive means driven by the bevel-disk pair and connecting the bevel-disk pair to the first drive shaft and the second drive shaft is preferably provided. The endless drive means is in particular a push belt.

Furthermore, it is preferably provided that the axis of the bevel-disk pair, the axis of the first output shaft, and the axis of the second output shaft form an isosceles triangle. The imaginary triangle is in particular an obtuse triangle.

A first clamping means acting on the endless drive means is preferably provided between the bevel-disk pair and the first output shaft; the first clamping means is configured in particular as a hydraulic clamping device.

Additionally, or alternatively, a second clamping means acting on the endless drive means is preferably provided between the first output shaft and the second output shaft, which second clamping means is specifically configured as a clamping roller.

Finally, it is preferably provided that the first output shaft and the second output shaft include deflection wheels interacting with the endless drive means.

Overall, the advantage of the present invention lies in an improvement of the smooth running of the vehicle, wherein the preferred designs each contribute further to an improved smooth running of the motor vehicle.

Due to the excellent properties of the vehicle with respect to its smooth running, the motor vehicle according to the invention is suited in particular as an agricultural, forestry, and/or construction motor vehicle, but can also advantageously be used in civil and disaster relief operations. Use as a tractor thus appears advantageous in particular.

BRIEF DESCRIPTION OF THE DRAWINGS

The invention is described in more detail with reference to a particularly preferred exemplary embodiment depicted in the accompanying drawings. Shown here.

DETAILED DESCRIPTION OF THE PREFERRED EMBODIMENTS

Figure 1:
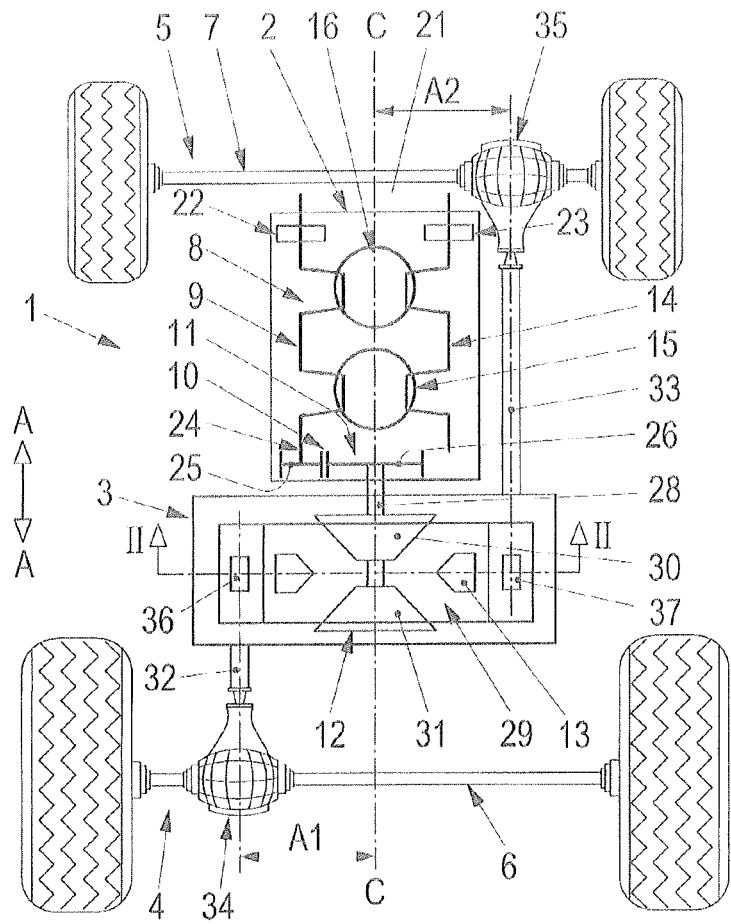
FIG. 1 shows a schematic plan view of a particularly preferred motor vehicle.

FIG. 1 shows an exemplary embodiment configured in a particularly preferred manner according to the invention.

In particular FIG. 1 shows a motor vehicle 1, which is configured as a tractor, tractor truck, hauler, or the like and in particular for use in uneven terrain of the agricultural and construction industry or for civil protection and disaster relief operations.

For its movement an internal combustion engine 2 and a stepless transmission 3 are installed in the motor vehicle 1. The transmission 3 interacts with the vehicle drive axles 4,5, i.e., a rear axle 6 and a front axle 7, wherein these axles are provided with wheels.

Figure 4:
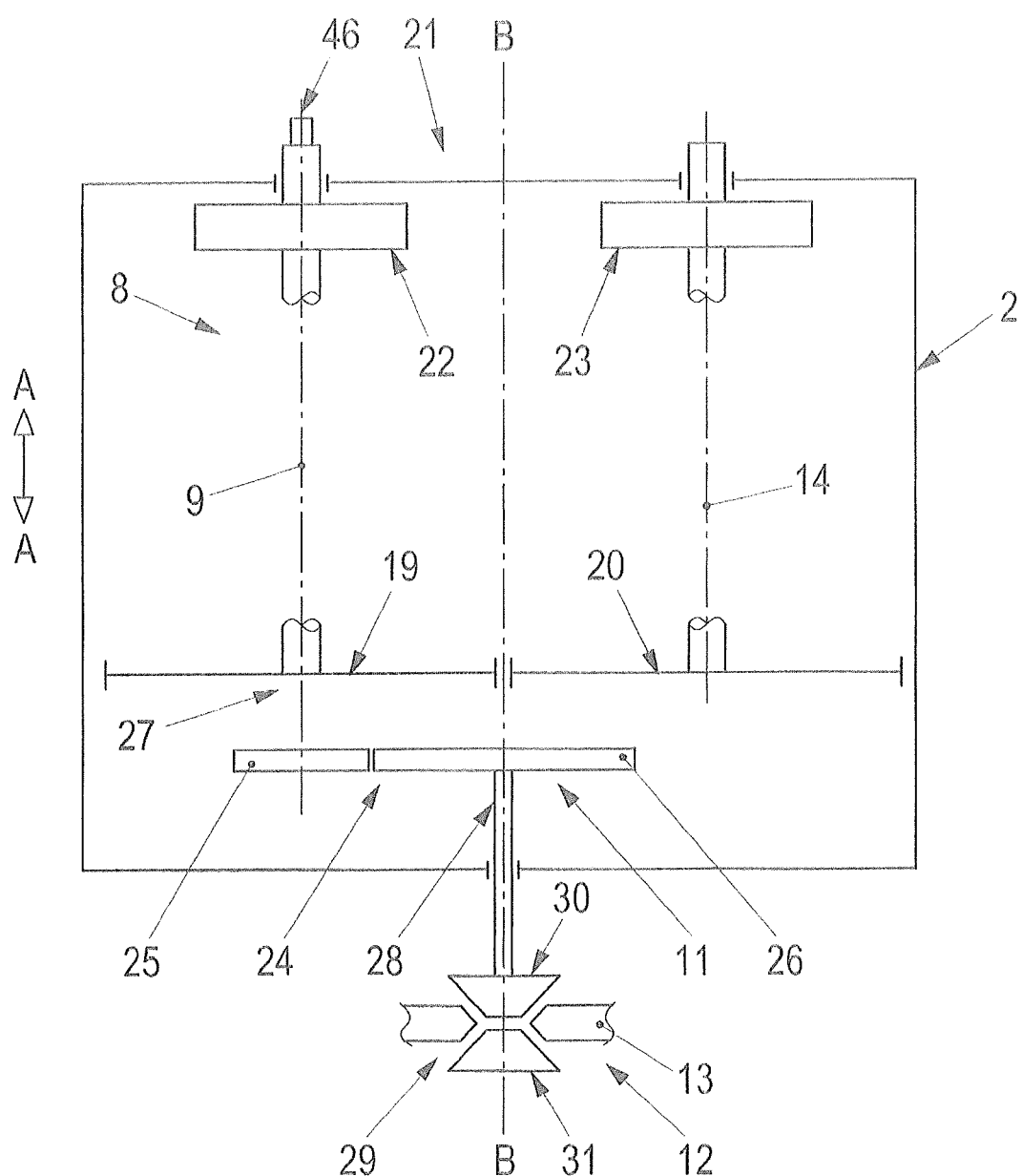
FIG. 4 shows a schematic partial view of FIG. 1.

The internal combustion engine 2 includes a crankshaft system 8 extending in vehicle longitudinal direction A-A (see FIG. 4) including at least one horizontally oriented crankshaft 9 that drives the transmission 3 with a stepless main transmission 12 on a first end region 10 facing the rear axle 6 by mediation of an intermediate transmission 11, which stepless main transmission 12 in turn influences the vehicle drive axles 4 and 5 or their wheels via an endless drive element 13.

The crankshaft system 8 comprises a crankshaft 9 and a further crankshaft 14. Both crankshafts 9, 14 are disposed parallel to each other and are driven by pistons 15 and 16 working in cylinders (not-depicted). Each piston 15, 16 is connected to the crankshafts 9, 14 by a connecting rod 17, 18 respectively, wherein one of the crankshafts 9 drives the intermediate transmission 11. The so-called double-crankshaft internal combustion engine 2 described above preferably works in the diesel method and specifically with direct injection, wherein it is particularly preferably provided with a turbocharger device (not depicted) for achieving a defined operating quality.

To optimize the smooth running of the internal combustion engine 2, the crankshafts 9, 14 rotate in opposite directions and synchronously due to synchronization gears 19, 20, wherein the synchronization gears 19, 20 are attached to the crankshafts 9, 14 adjacent to the first end region 10 facing the rear axle 6. Furthermore, flywheels 22, 23 are attached to a second end region 21 of the crankshafts 9, 14, which end region 21 faces away from the first end region 10.

The intermediate transmission 11 is formed by a spur gearing 24 including two mutually engaging gears 25, 26. Here the gears 25, 26 of the intermediate transmission 11 have different diameters. The smaller gear 25 is attached to the crankshaft 9 adjacent to an output side 27, wherein the larger gear 26 is connected to an input shaft 28 of the main transmission 12. The larger gear 26 with the input shaft 28 specifically lies on the internal-combustion-engine longitudinal axis B-B extending between the crankshafts 9, 14.

The stepless main transmission 12 is a so-called CVT transmission 29, which includes a pair of bevel disks 30, 31, namely fixed disk and moving disk, wherein the bevel disks 30, 31 are surrounded by the endless drive means 13. The endless drive means 13 works together with the vehicle drive axles 4, 5 by mediation of output shafts 32, 33. Differentials 34, 35 are provided between the vehicle drive axles 4, 5 and the drive shafts 32, 33 of the stepless main transmission 34, 35. The output shafts 32, 33 of the main transmission 12 extend with the same distance, namely A1=A2 to the internal-combustion-engine longitudinal axis B-B. This simultaneously corresponds to the motor vehicle longitudinal axis C-C.

Figure 2:
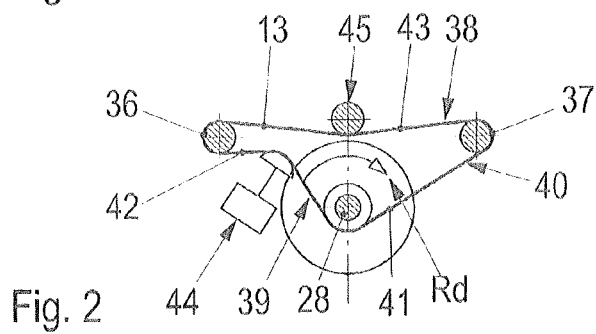
FIG. 2 shows a sectional view along the line depicted in FIG. 1.
Figure 3:
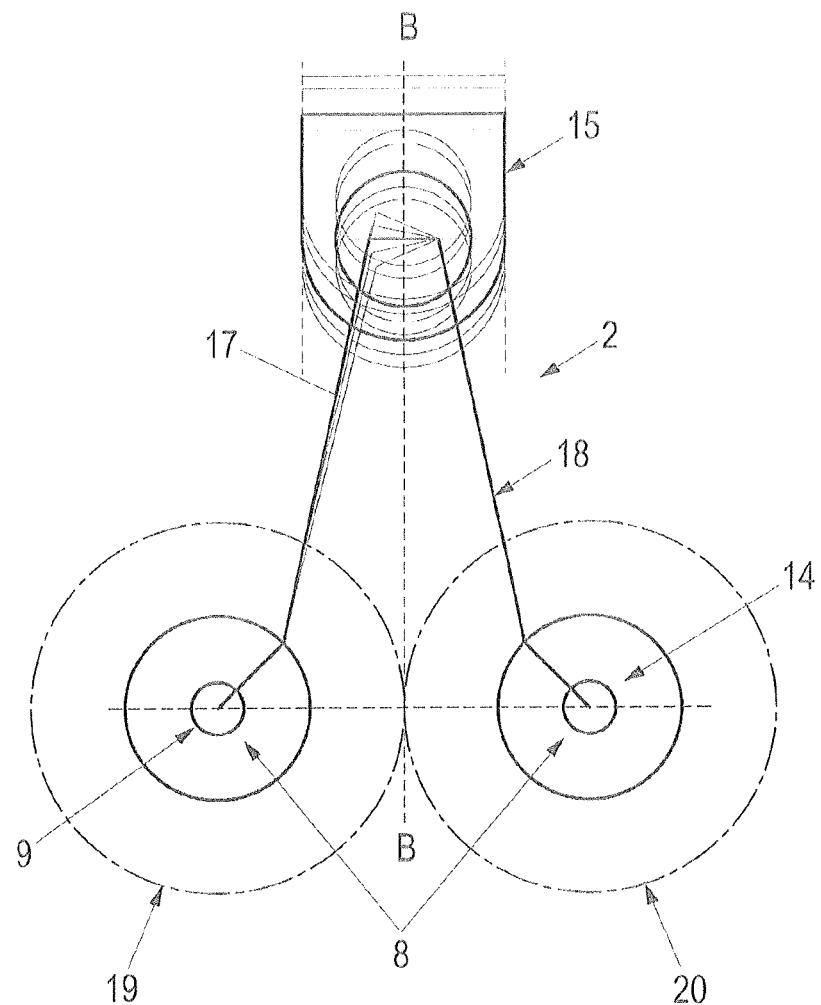
FIG. 3 shows a schematic depiction of a preferably designed internal combustion engine including two crankshafts and at least one piston.

The endless drive element 13 surrounds the deflection wheels 36, 37 provided on the output shafts 32, 33 as well as the bevel disks 30, 31 and forms with said deflection wheels 36, 37 and the bevel disks 30, 31 an obtuse-angle triangle 38 having two equal sides 39, 40 (FIG. 2). The internal combustion engine 2 is an internal combustion engine 2 rotating clockwise indicated by arrow direction Rd and thus includes a load strand 41 and two idle strands 42, 43. In the above-described construction a hydraulic clamping device 44 acts at least on the load strand 42. Furthermore, a clamping roller 45 is applied on the idle strand 43.

Finally, the endless drive element 13 preferably consists of a push belt. At least downstream of the flywheel 22 is a PTO shaft 4 (FIG. 4) for auxiliary drives, such as, for example, cable winches, water pumps, mower units, or the like, wherein the PTO shaft 4 is connected to the crankshaft 9 such that they rotate together.

REFERENCE NUMBER LIST

1 Motor vehicle
2 Internal combustion engine
3 Transmission system
4, 5 Vehicle drive axle
6 Rear axle
7 Front axle
A-A Vehicle longitudinal direction
8 Crankshaft system
9 Crankshaft
10 End region
11 Intermediate transmission
12 Main transmission
13 Endless drive element
14 Crankshaft
15, 16 Piston
17, 18 Connecting rod
19, 20 Synchronization gear
21 End region
22, 23 Flywheel 24 Spur gearing
25, 26 Gear
27 Output side
28 Input shaft
B-B Internal-combustion-engine longitudinal central plane
29 Transmission
30, 31 Bevel disk
32, 33 Output shaft
34, 35 Differential
36, 37 Deflection wheel
38 Triangle
39 Side
Rd Arrow direction
40, 41 Load strand
42, 43 Idle strand
44 Clamping device
45 Clamping roller
46 PTO shaft

The invention claimed is:

1. A motor vehicle including
a motor and
a transmission including
a drive shaft driven by the motor and connecting the motor to the transmission,
a first output shaft extending along the vehicle longitudinal axis in the one direction, which first output shaft is connected to a first wheel axle by a first differential, and
a second output shaft extending along the vehicle longitudinal axis in the opposite direction, which second output shaft is connected to a second wheel axle by a second differential, wherein
the drive shaft is disposed in the longitudinal axis of the motor vehicle, and the first and second output shafts are disposed spaced along opposite sides with respect to the longitudinal axis of the motor vehicle with identical spacing to the longitudinal axis of the motor vehicle, wherein the first and the second output shaft are disposed on opposing sides with respect to the longitudinal axis of the motor at identical spacing with respect to the longitudinal axis of the motor.

2. The motor vehicle according to claim 1, wherein the motor is an internal combustion engine.

3. The motor vehicle according to claim 2, wherein the internal combustion engine includes two crankshafts driven synchronously in opposite directions, which are each connected to at least one common piston by a connecting rod.

4. The motor vehicle according to claim 3, wherein the crankshafts are disposed symmetrically with respect to the longitudinal axis of the motor vehicle.

5. The motor vehicle according to claim 3, wherein the one crankshaft is connected to the driveshaft of the transmission by an intermediate transmission.

6. The motor vehicle according to claim 5, wherein the intermediate transmission is a spur gearing.

7. The motor vehicle according to claim 6, wherein the spur gearing is formed from a first gear connected to the one crankshaft and a second gear connected to the drive shaft of the transmission.

8. The motor vehicle according to claim 7, wherein the first gear has a smaller diameter than the second gear.

9. The motor vehicle according to claim 3, wherein the crankshafts are oriented horizontally.

10. The motor vehicle according to claim 3, wherein flywheels are disposed on the end of the crankshafts opposite the intermediate transmission.

11. The motor vehicle according to claim 10, further comprising at least one PTO shaft, which is connected to one of the crankshafts disposed adjacent to the flywheel of the crankshaft such that they rotate together.

12. The motor vehicle according to claim 3, wherein the first output shaft and the second output shaft are disposed in one plane.

13. The motor vehicle according to claim 12, wherein the crankshafts are disposed in the plane of the output shafts.

14. The motor according to claim 1, wherein the internal combustion engine is a diesel engine.

15. The motor vehicle according to claim 1, wherein the transmission is a stepless transmission.

16. The motor vehicle according to claim 15, wherein the stepless transmission is a CVT transmission including a bevel disk pair driven by the driveshaft.

17. The motor vehicle according to claim 16, further comprising an endless drive means driven by the bevel disk pair and connecting the bevel disk pair to the first output shaft and the second output shaft.

18. The motor vehicle according to claim 17, wherein the axis of the bevel disk pair, the axis of the first output shaft and the axis of the second output shaft form an isosceles triangle.

19. The motor vehicle according to claim 18, wherein the isosceles triangle is an obtuse triangle.

20. The motor The Motor vehicle according to claim 19, further comprising a first clamping means, acting on the endless drive means, between the bevel disk pair and the first output shaft.

21. The motor vehicle according to claim 20, further comprising a second clamping means, acting on the endless drive means, between the first output shaft and the second output shaft.

22. The motor vehicle according to claim 21, wherein first clamping means is a hydraulic clamping device.

23. The motor vehicle according to claim 21, wherein the second clamping means is a clamping roller.

24. The motor vehicle according to claim 16, wherein the first output shaft and the second output shaft include deflection wheels interacting with the endless drive means.

25. The motor vehicle according to claim 17, wherein the endless drive means is a push belt.

26. The motor vehicle according to claim 1, wherein the motor vehicle has all-wheel drive.

27. The motor vehicle according to claim 1, wherein the motor vehicle is an agricultural, forestry, and/or construction motor vehicle.

* * * * *